United States Patent Office 2,855,381
Patented Oct. 7, 1958

2,855,381

ORGANOPOLYSILOXANE AMIDES

Leo H. Sommer, University Park, Pa., assignor to Dow Corning Corporation, Midland, Mich., a corporation of Michigan No Drawing. Application July 18, 1955
Serial No. 522,825

8 Claims. (Cl. 260—46.5)

This invention relates to novel or organopolysiloxanes having amide groups attached to the silicon through carbon atoms.

This application is a continuation-in-part of applicant's copending application Serial No. 512,329 now abandoned, filed May 31, 1955.

Heretofore amide groups attached to silicon atoms have been disclosed and claimed in U. S. Patent 2,610,198. These compounds have four organic groups attached to the silicon and hence cannot be polymerized into polymeric siloxanes. Consequently, the utility thereof is limited as compared with the utility of the compounds of this invention.

One of the difficulties which has long plagued the organosilicon art has been the fact that organosilicon polymers and resins are deleteriously affected by hydrocarbon solvents and oils. The heretofore employed resins and rubbers swell and will deteriorate when subjected to these solvents. This is a serious defect for many applications which require multiple coatings or for those applications which require sealing in contact with such solvents and oils. As a result there has been a prolonged and intensive search for organosiloxane materials which will not deteriorate or which show greatly improved stability in contact with hydrocarbon solvents. Applicant has found that the compositions of this invention, both homopolymers and copolymers, show a greatly reduced swell when subjected to the solvents.

It is the object of this invention to provide novel organopolysiloxanes which show improved resistance to hydrocarbon oils and solvents. Another object is to provide materials suitable for use in siloxane rubbers which give improved strength. Other objects and advantages will be apparent from the following description.

This invention relates to polymeric siloxanes of the unit formula

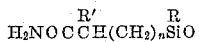

in which R' is methyl or hydrogen, $n$ has a value from 1–3 inclusive and R is a monovalent hydrocarbon radical free of aliphatic unsaturation.

The polysiloxane amides of this invention in which $n$ is 1 may be prepared starting with the acids disclosed and claimed in applicant's copending application Serial No. 522,826 filed simultaneously herewith entitled, "Organopolysiloxane Acids and Esters," which is hereby made a part of this specification. The preparation of the polysiloxane amides from these polysiloxane acids involves the treatment of the acids with $SOCl_2$ to form the corresponding polysiloxaneacylchlorides which are then treated with ammonia gas to replace the chlorine to form the corresponding amides. The resulting polymer is then washed free of HCl and any ammonium chloride. Alternatively the amides of this invention may be prepared from the corresponding nitriles disclosed and claimed in the applicant's copending application Serial No. 522,827 filed simultaneously herewith entitled, "Organopolysiloxane Nitriles," which is hereby made a part of this specification. The amides are prepared by hydrolyzing the nitriles with cold concentrated sulfuric acid. The nitriles shown in the aforesaid application are monomers having the general formula

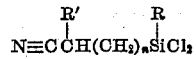

and polymers of the unit formula

where R', R, and $n$ are as above defined.

The polysiloxane amides of this invention can be copolymerized with siloxanes of the unit formula

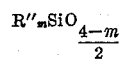

in which R" is a monovalent hydrocarbon radical and $m$ has an average value of from 1–3 inclusive. These copolymers may be prepared by interacting two or more of the various siloxanes in the presence of acid or alkaline catalysts. The copolymerization conditions should be such that the amide groups are not hydrolyzed. In general the interaction is best carried out under anhydrous conditions but water may be present if the temperature employed is low (i. e. about room temperature).

For the purpose of this invention the copolymers can range in composition from .1–99.9 mol percent siloxane units of the formula

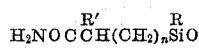

and from .1–99.9 mol percent siloxane units of the formula

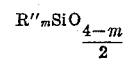

in which R, R', R" $m$ and $n$ are as above defined. These copolymers may contain 1 or more different types of siloxane amide units and may contain any combination of units of the formula $R''SiO_{3/2}$, $R''_2SiO$ and $R''SiO_{.5}$. There can be more than 1 type of R" groups attached to any 1 silicon atom.

For the purpose of this invention R can be any saturated aliphatic hydrocarbon radical such as methyl, ethyl, propyl, octadecyl or t-butyl; any saturated aliphatic hydrocarbon radical such as cyclohexyl and cyclopentyl; any aryl hydrocarbon radical such as phenyl, tolyl or xenyl and any aralkyl hydrocarbon radical such as benzyl. R" can be any monovalent hydrocarbon radical such as alkyl radicals such as methyl, ethyl, butyl and octadecyl; alkenyl radicals such as vinyl, allyl and hexenyl; cycloaliphatic radicals such as cyclohexyl and cyclohexenyl; aralkyl hydrocarbon radicals such as benzyl and aromatic hydrocarbon radicals such as phenyl, tolyl, xenyl and naphthyl.

The polymers of this invention may be formed into rubbers by any of the conventional techniques for preparing organosiloxane rubbers. The polymers can be vulcanized by any of the conventional vulcanizing agents such as organic peroxides, sulfur or combinations of alkoxypolysilicates and metal salts of carboxylic acids. Sulfur vulcanization is used only when alkenyl groups are present in the polymers. These rubbers may contain any of the conventional fillers, oxidation inhibitors, compression set additives and pigments which are normally employed in silicone rubbers.

The following examples are illustrative only and should not be construed as limiting the invention which is properly delineated in the appended claims. The symbols Me, Ph, and Vi have been used hereafter in accord with their usual meanings of methyl, phenyl, and vinyl radicals respectively.

Example 1

A sample of the polysiloxane acid having the unit formula $$\text{HOOCCH}_2\text{CH}_2\overset{\text{Me}}{\underset{}{\text{SiO}}}$$

was treated with an excess of thionyl chloride and the excess thionyl chloride was subsequently removed to give 41 g. of the polysiloxane acid chloride of the formula $$\text{ClOCCH}_2\text{CH}_2\overset{\text{Me}}{\underset{}{\text{SiO}}}$$

This acid chloride was dissolved in 500 ml. of anhydrous diethyl ether and ammonia gas was bubbled slowly through the solution with rapid stirring. The mixture became snow white and then very viscous. More anhydrous ether was added and after about 1 hour the reaction was stopped. Water was added to dissolve the ammonium chloride and the solution was filtered and the solvent removed. The resulting product after drying was a hard, brittle, resinous material. It was insoluble in water, benzene, acetone and hexamethyldisiloxane but dissolved quite readily in concentrated sulfuric acid. This material was the polysiloxane amide of the unit formula $$\text{H}_2\text{NOCCH}_2\text{CH}_2\overset{\text{Me}}{\underset{}{\text{SiO}}}$$

Example 2

7.5 parts by weight of the polysiloxane amide of Example 1 was dissolved in 100 ml. of concentrated sulfuric acid. 16.9 parts by weight of octamethylcyclotetrasiloxane was added and stirring was continued until the solution was complete. The mixture was poured with stirring into cracked ice. The solution turned milky and soon a white polymer precipitated. This polymer was separated from the water by filtration and was broken up into small pieces and washed with water to remove all of the sulfuric acid. The resulting product was a rubbery material which when thoroughly dried and shaped into a ball bounced like natural rubber. This material was a copolymer of 80 mol percent dimethylsiloxane and 20 mol percent $$\text{H}_2\text{NOCCH}_2\text{CH}_2\overset{\text{Me}}{\underset{}{\text{SiO}}}$$

units.

A sample of this polymer was immersed in isooctane at 25° C. and the percent increase in volume was determined and found to be 23.8 percent after 30 minutes, 48.4 percent after 2 hours and 78 percent after 5.5 hours. By contrast a partially vulcanized copolymer of vinylmethylsiloxane and dimethylsiloxane swelled 210 percent after 2 hours immersion in isooctane at 25° C.

Example 3

4.4 parts by weight of the polysiloxane amide of Example 1 was dissolved in 100 ml. of concentrated sulfuric acid and 29.7 g. of octamethylcyclotetrasiloxane was added with stirring. When solution was complete the mixture was poured into ice water. A sticky polymer separated and the mixture was extracted with water and the solvent was removed on a steam bath. Upon drying the polymer was rubbery and possessed elastic rebound. This polymer was composed of 92.3 mol percent dimethylsiloxane units and 7.7 mol percent $$\text{H}_2\text{NOCCH}_2\text{CH}_2\overset{\text{Me}}{\underset{}{\text{SiO}}}$$

units.

A piece of this material was immersed in isooctane at 25° C. and after ½ hour the volume had increased 75.3 percent and after 2 hours it had increased 174 percent. By contrast a partially vulcanized copolymer of methylvinylsiloxane and dimethylsiloxane increased in volume 100 percent in 30 minutes and 210 percent in 2 hours under the same conditions.

Example 4

5.2 parts by weight of the copolymer of Example 3 was interacted with 28 parts by weight of octamethylcyclotetrasiloxane by heating a mixture of the two with solid NaOH until a gummy, viscous material was obtained. The resulting polymer was ground in a mortar and washed with water. After drying the polymer was an elastic rubbery material of good tensile strength. This material was a copolymer of about 1.2 mol percent $$\text{H}_2\text{NOCCH}_2\text{CH}_2\overset{\text{Me}}{\underset{}{\text{SiO}}}$$

units and 98.8 mol percent dimethylsiloxane units.

Example 5

When a polysiloxane acid of the formula $$\text{HOOCCH}_2\text{CH}_2\overset{\text{Ph}}{\underset{}{\text{SiO}}}$$

is employed in the procedure of Example 1 a solid polysiloxane amide of the unit formula $$\text{H}_2\text{NOCCH}_2\text{CH}_2\overset{\text{Ph}}{\underset{}{\text{SiO}}}$$

is obtained.

When this material is interacted in equimolar amounts with a copolymer of 10 mol percent $\text{ViSiO}_{3/2}$, 15 mol percent $\text{PhMeSiO}$, 10 mol percent $\text{Ph}_2\text{SiO}$, 63 mol percent $\text{Me}_2\text{SiO}$ and 2 mol percent $\text{Me}_3\text{SiO}_{.5}$ in accordance with the procedure of Example 2, a viscous polymer of the composition 5 mol percent $\text{ViSiO}_{3/2}$, 7.5 mol percent $\text{PhMeSiO}$, 5 mol percent $\text{Ph}_2\text{SiO}$, 31.5 mol percent $\text{Me}_2\text{SiO}$, 1 mol percent $\text{Me}_3\text{SiO}_{.5}$ and 50 mol percent $$\text{H}_2\text{NOCCH}_2\text{CH}_2\overset{\text{Ph}}{\underset{}{\text{SiO}}}$$

is obtained.

Example 6

28 g. of the polysiloxane $$(\text{HOOCCHCH}_2\overset{\text{Me}}{\underset{}{\text{SiO}}})_x$$ (with Me on CH)

and 33 g. of thionyl chloride were mixed and shaken. Evolution of gas occurred. When the reaction had subsided, the mixture was heated to 110° C. When all of the polymer had dissolved the mixture was heated on a steam bath for 16 hours. The excess thionyl chloride was removed at reduced pressure and there was obtained a quantitative yield of the compound.

$$(\text{ClOCCHCH}_2\overset{\text{Me}}{\underset{}{\text{SiO}}})_x$$

48 g. of this polyacylchloride was dissolved in 600 cc. of ether. Gaseous ammonia was bubbled through the solution for 30 minutes. Sufficient ice was added to dissolve the ammonium chloride. The resulting solution was filtered and washed with water until neutral. 40 g. of a solid polymeric amide of the unit formula $$(\text{H}_2\text{NOCCHCH}_2\overset{\text{Me}}{\underset{}{\text{SiO}}})_x$$

was obtained.

4.35 g. of this polyamide and 8.88 g. of octamethylcyclotetrasiloxane were dissolved in 50 ml. of concentrated sulfuric acid. The homogeneous solution was stirred for 15 minutes and then added with stirring to ice. A tough, rubbery copolymer having the composition 20 mol percent $$\text{H}_2\text{NOCCHCH}_2\overset{\text{Me}}{\underset{}{\text{SiO}}}$$

and 80 mol percent $\text{Me}_2\text{SiO}$ was obtained.

Example 7

.5 mol of the compound $$\text{NC(CH}_2)_3\overset{\text{Me}}{\underset{}{\text{SiCl}_2}}$$

was mixed with 100 ml. of glacial acetic acid and 150 ml. of concentrated HCl. The mixture was refluxed for 2 hours. The mixture was distilled until vigorous bumping occurred whereupon the residue was filtered. The filtrate was a clear, viscous liquid which was extracted with water to remove ammonium acetate. Benzene was then added and the product was dried by azeotropic distillation. The resulting product was the acid siloxane of the unit formula

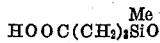

2 mols of thionyl chloride were mixed with this acid and the material was allowed to react for several hours. When gas evolution had ceased the mixture was heated to 50° C. 2 hours. The excess thionyl chloride was removed by vacuum distillation and there was obtained a clear, slightly yellowish, viscous fluid of the unit formula

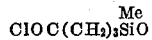

This acyl halide was dissolved in 600 ml. of ether and ammonia gas was bubbled through the mixture for 40 minutes. Ice was added to dissolve the ammonium chloride and the mixture was filtered. There was obtained a white, solid, elastic polymeric material of the unit formula

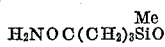

21.3 g. (.132 mol) of this polysiloxane amide were dissolved in 100 ml. of concentrated sulfuric acid. 39 g. (.132 mol) of octamethylcyclotetrasiloxane were added to the solution. The resulting homogeneous solution was poured with stirring onto ice and an oily polymeric material separated. The mixture was extracted repeatedly with ether and the ether solution was evaporated to dryness to give a sticky, tough, elastic copolymer having the composition 20 mol percent

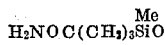

and 80 mol percent Me$_2$SiO.

*Example 8*

10 g. of the compound

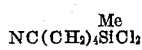

were dissolved in 35 g. of concentrated sulfuric acid. The chlorosilane reacted rapidly with the acid to give HCl. The nitrile groups were simultaneously hydrolyzed to amide groups. After standing for 30 minutes the reaction mixture was poured onto 30 g. of ice. The organic layer was separated and allowed to stand whereupon a hard, rubbery polymer of the unit formula

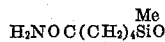

was obtained.

This material was also prepared from the siloxane acid of the unit formula

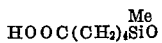

by the steps described in Example 7.

10 g. of the polyamide siloxane was dissolved in 50 ml. of concentrated sulfuric acid and 22.5 g. of octamethylcyclotetrasiloxane were added to the solution. Ice was added to the solution until all of the polysiloxane precipitated. A copolymer was separated from the acid layer and washed with water to give a sticky, rubbery copolymer having the composition 20 mol percent

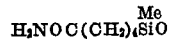

and 80 mol percent Me$_2$SiO.

That which is claimed is:

1. A polymeric siloxane of the unit formula

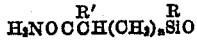

in which R' is selected from the group consisting of methyl radicals and hydrogen atoms, R is a monovalent hydrocarbon radical free of aliphatic unsaturation, and $n$ has a value from 1–3 inclusive.

2. A polymeric siloxane of the unit formula

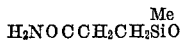

where the symbol Me represents a methyl radical.

3. A polymeric siloxane of the unit formula

where the symbol Me represents a methyl radical.

4. A polymeric siloxane of the unit formula

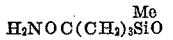

where the symbol Me represents a methyl radical.

5. A polymeric siloxane of the unit formula

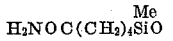

where the symbol Me represents a methyl radical.

6. A copolymeric siloxane consisting of from .1–99.9 mol percent siloxane units of the formula

wherein R' is selected from the group consisting of methyl radicals and hydrogen atoms, R is a monovalent hydrocarbon radical free of aliphatic unsaturation and $n$ has a value from 1–3 inclusive and from .1–99.9 mol percent siloxane units of the formula $$R''_m SiO_{\frac{4-m}{2}}$$

in which R'' is a monovalent hydrocarbon radical and $m$ has an average value from 1–3 inclusive.

7. A method for the preparation of organopolysiloxane amides which comprises dissolving an organosilicon nitrile selected from the group consisting of nitriles of the formula

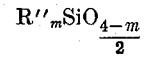

and polymers having the unit formula

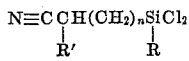

where R' is selected from the group consisting of methyl radicals and hydrogen atoms, R is a monovalent hydrocarbon radical free of aliphatic unsaturation, and $n$ has a value of from 1 to 3 inclusive, in concentrated sulfuric acid, and contacting the resulting solution with water in a liquid phase.

8. A method for the preparation of organopolysiloxane amides which comprises dissolving an organosilicon nitrile of the formula

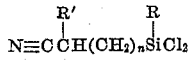

where R' is selected from the group consisting of methyl radicals and hydrogen atoms, R is a monovalent hydrocarbon radical free of aliphatic unsaturation, and $n$ has a value of from 1 to 3 inclusive, in concentrated sulfuric acid, and contacting the resulting solution with water in a liquid phase.

References Cited in the file of this patent

UNITED STATES PATENTS

| | | |
|---|---|---|
| 2,607,793 | Sommer | Aug. 19, 1952 |
| 2,723,987 | Speier | Nov. 15, 1955 |

UNITED STATES PATENT OFFICE
CERTIFICATE OF CORRECTION

Patent No. 2,855,381                      October 7, 1958

Leo H. Sommer

It is hereby certified that error appears in the printed specification of the above numbered patent requiring correction and that the said Letters Patent should read as corrected below.

Column 1, line 15, strike out "or"; column 2, line 40, for "$R''SiO_{.5}$" read -- $R''_3SiO_{.5}$ --; column 4, line 74, for "MCl" read -- HCl --; column 5, line 12, after "50° C." insert -- for --.

Signed and sealed this 13th day of January 1959.

(SEAL)
Attest:

KARL H. AXLINE                                       ROBERT C. WATSON

Attesting Officer                                    Commissioner of Patents